(12) United States Patent
Moehlen et al.

(10) Patent No.: US 11,646,584 B2
(45) Date of Patent: May 9, 2023

(54) ENERGY ALLOCATION SYSTEM

(71) Applicant: CRAFTSTROM LIMITED, Hong Kong (CN)

(72) Inventors: Christian Moehlen, Hamburg (DE); Stephan Arpad Scherer, Vienna (AT)

(73) Assignee: CRAFTSTROM LIMITED, Hong Kong (CN)

( * ) Notice: Subject to any disclaimer, the term of this patent is extended or adjusted under 35 U.S.C. 154(b) by 17 days.

(21) Appl. No.: 17/533,928

(22) Filed: Nov. 23, 2021

(65) Prior Publication Data

US 2022/0085615 A1 Mar. 17, 2022

Related U.S. Application Data

(63) Continuation of application No. 17/311,660, filed as application No. PCT/EP2019/084685 on Dec. 11, 2019.

(30) Foreign Application Priority Data

Dec. 12, 2018 (EP) .................................... 18212041

(51) Int. Cl.
*H02J 3/38* (2006.01)
*H02J 7/00* (2006.01)
*H02J 13/00* (2006.01)
*H02J 7/35* (2006.01)
*G05B 19/042* (2006.01)

(52) U.S. Cl.
CPC ............. *H02J 3/381* (2013.01); *G05B 19/042* (2013.01); *H02J 7/0068* (2013.01); *H02J 7/35* (2013.01); *H02J 13/00002* (2020.01); *H02J 13/00004* (2020.01); *H02J 13/00026* (2020.01); *G05B 2219/2639* (2013.01); *H02J 2300/24* (2020.01)

(58) Field of Classification Search
CPC ........ H02J 3/38; H02J 3/381; H02J 13/00026; H02J 13/00004; H02J 13/00002; H02J 7/0068; H02J 7/35; H02J 2300/24; H02J 7/00; H02J 13/00; G05B 19/042; G05B 2219/2639
See application file for complete search history.

(56) References Cited

U.S. PATENT DOCUMENTS

2012/0112544 A1\* 5/2012 Salcone ................ H02J 7/0048
307/65

FOREIGN PATENT DOCUMENTS

AU 2009298259 A1 \* 5/2011 ............... G05F 1/67

\* cited by examiner

*Primary Examiner* — Robert L Deberadinis
(74) *Attorney, Agent, or Firm* — James R. Gourley; Carstens, Allen & Gourley, LLP

(57) ABSTRACT

Energy allocation system comprises a solar panel system and a local energy storage system, each capable of being plugged into a power socket of a home grid and each having a communication unit. The system further comprises a control unit, comprising a third communication unit, configured to receive the information relating to the solar panel system, and the information relating to the energy storage system via said communication units, and a processing unit. The processing unit is configured to determine, based on the received information, an allocation of energy in the home grid to the energy storage system, and to accordingly generate a control signal for the energy storage system. The third communication unit is further configured to transmit the generated control signal to the energy storage system.

20 Claims, 6 Drawing Sheets

ENERGY ALLOCATION SYSTEM

CROSS REFERENCE TO RELATED APPLICATION

This application is a continuation patent application of co-pending U.S. patent application Ser. No. 17/311,660 entitled "Energy Allocation System" filed on Jun. 7, 2021, which is a US 371 application from PCT/EP2019/084685 entitled "ENERGY ALLOCATION SYSTEM" filed on Dec. 11, 2019 and published as WO 2020/120591 A1 on Jun. 18, 2020, which claims priority to EP Patent Application No. 18212041.0 filed on Dec. 12, 2018. The technical disclosures of every application and publication listed in this paragraph are hereby incorporated herein by reference.

The invention relates to the architecture of a system for the improved allocation of energy supply and consumption. The system is in particular foreseen for use in a home environment, such as in an apartment or a house, in which at least one local energy source, at least one energy storage device, and a plurality of energy consuming devices are all plugged in to a same home energy grid.

BACKGROUND

Traditional allocation of energy supply in a home is simple: energy is supplied from the outside (i.e. from the public energy grid) to the home energy grid, and is consumed by a variety of electric equipment plugged into this home energy grid. Increasingly, local, independent production of energy occurs, for instance in the form of roof top solar panels. This is then a second source of power, which is supplied to the home energy grid. All generated energy which is not consumed in the household is added to the public grid, and consumers may get a fee for such energy production. Thereto, such systems include a separate meter to track supply of electricity to the public grid.

The solar panels, or other local energy sources, may be installed by a specialized technician, but so-called "plug&play" solutions, in which a user can simply plug the panels into an existing electrical power socket/outlet, have also been proposed. Note that in the description below, solar panels are used as an exemplary system, but this is not intended to exclude other types of local, independent energy sources, such as for instance energy systems based on wind energy.

Local, independent energy sources, such as solar panels, often have an irregular and/or unpredictable yield of energy. Therefore, it can be advantageous to enable temporary storage of energy in an energy storage system within the home, such as a battery, to prevent endless switching between getting energy from the public grid and delivering energy to the public grid.

In existing solutions, such an energy storage system is often integrated and/or closely connected to the solar panel system. In particular, the solar panels and the energy storage system are generally connected in series, to assure that together, they function as an energy source with a more reliable and stable production: if the energy produced by the solar panels and stored in the battery is less than is required by the energy consuming devices, it will be supplemented from the public grid; if the solar panel produces more than is required by the energy consuming devices, this excess energy will first be used to charge the battery, and only put back into the public grid if the battery is full; and if the solar panel does not yield any energy (for instance at night) but there is still energy in the battery, this will be available to the energy consuming devices.

This system, in principle, works fairly well. However, it requires a specialized technician to install for non-plug-and-play versions, and is quite inflexible: it cannot be controlled, and it is difficult to modify either the solar panels or the storage capacity. Furthermore, this system often restricts the placement of the storage system, and may even require placement outside, under less than ideal conditions for the lifecycle of the battery.

Batteries of the "plug&play" type, which can be plugged into a power socket/outlet of the home grid, have also been proposed. However, a drawback is that since these batteries are connected in parallel to the solar panels, and since it is not possible to distinguish in the home grid between energy produced by the solar panels and energy originating from the public grid, there may be an undesirable draw from the public grid to keep the battery charged.

SUMMARY OF THE INVENTION

It is an object of the invention to resolve at least some of the above-mentioned problems. In particular, it aims at improving energy allocation in systems in which at least one local energy source, at least one energy storage device, and a plurality of energy consuming devices are all plugged in to a same home energy grid. Such improved allocation is desired currently so as to reduce costs and personally engage people in sustainable development, and, in the future, as the energy supply is expected to decrease due to limitations in the production of electricity, and also in light of maintenance and stability issues with the public electricity grid already occurring.

The desirable improved energy allocation may be achieved according to a first aspect in a system comprising:
 a local energy source, preferably a solar panel system, capable of being plugged into a power socket of a home grid, and comprising or being communicatively coupled to a first communication unit configured to transmit information relating to the local energy source;
 a local energy storage system, capable of being plugged into another power socket of the home grid, and comprising or being communicatively coupled to a second communication unit configured to transmit information relating to the energy storage system and to receive control signals;
 a control unit, comprising a third communication unit, configured to receive the information relating to the local energy source from the first communication unit, and the information relating to the energy storage system from the second communication unit, and a processing unit;
 wherein the processing unit is configured to determine, based on the received information, an allocation of energy in the home grid to the energy storage system, and to accordingly generate a control signal for the energy storage;
 wherein the third communication unit is further configured to transmit the generated control signal to the energy storage system.

The first communication unit may be unit integrated with or coupled to the inverter of a solar panel system—such an inverter is always needed at least to convert the DC current produced by the panels into AC current for the home grid and may additionally have security and safety functions. Primarily, this first communication unit is configured to transmit information about the current energy production; however, it may also transmit other information, for instance from sensors of the solar panel system, and it may also in some cases be able to receive information, for instance instructions to change an orientation of the solar panel.

The energy storage system preferably consists of a base and a battery, wherein the second communication unit is preferably integrated with or coupled to the base. For instance, the second communication unit can be integrated with a controller of the energy storage system, further described later. The second communication unit is configured to transmit information relating to the energy storage system: this will in many cases primarily be information relating to the amount of energy stored in the energy storage system and/or the rate of charging/discharging, but it may include much more information, for instance from sensors. The energy storage system may also comprise an inverter; in such embodiments, the second communication unit can be incorporated in or integrated with this inverter, which may then also include, be part of, or be coupled to a controller of the energy storage system.

The control unit can be a hardware unit, and may even be part of the local energy source or the energy storage system; however, it is advantageously embodied as a cloud service. The control unit receives information from the local energy source and from the energy storage system, and the processing unit according generated control signals to advantageously allocate energy present in the home grid, which control signals are then transmitted to the energy storage unit by the third communication unit. For instance, if the control unit receives information indicating that the local energy source is not producing energy, it may instruct the energy storage system to shut off and/or to not take any energy from the home grid such that no energy will be drawn from the public grid for this system.

In one advantageous embodiment, the first and the second communication units are configured for operation in accordance with one or more wireless networks. More particularly, it is deemed advantageous that the first and second communication units are configured for communication via a wireless local area network, whereas the third communication unit is coupled to said local area network via an external connection, typically a wired connection such as a cable connection.

Preferably, the first and the second communication units are configured for wireless communication between each other separate from any local area network. This configuration is in an advantageous embodiment arranged with hardware and/or software means for wireless communication according to a further wireless communication protocol. This allows exchange between the said communication units even in the case that the local area network would not work. Furthermore, it allows a more direct communication. In one implementation, the said exchange via a further wireless communication protocol may be configured for transmission of data from the solar panel to the energy storage system, either upon request of the energy storage system or upon request of the solar panel, or in a manner that both options are feasible.

In a further implementation, the energy storage system, and particularly an inverter thereof, further comprises a controller configured to control the charging and discharging of the battery, dependent on the inflow of energy from the solar panel and an actual local demand for energy. By controlling the flow of energy from and to the energy storage system, it is feasible to ensure that the effective electricity intake into a home from the grid is managed. The controller is preferably configured for operation in accordance with a guideline transmitted from the control unit. It is however not excluded that the control unit would provide individual control commands. A guideline is herein defined as a set of commands to be executed during a period of time, such as for instance 24 hours. Such guideline may further comprise several options, dependent on actual local operation, such as weather conditions, incidental, not planned use of certain equipment and the like. In the latter case, the controller of the energy storage system is configured to change operation between the said options, dependent on local input.

More preferably, the controller is furthermore configured for operation on the basis of information transmitted directly from the solar panel. Such configuration is for instance implemented in that the controller within the energy storage system is configured to modify a guideline received from the control unit, under certain conditions specified therein. For instance, in case that information from the solar panel is received that the electricity production is reduced with 50% (due to change in weather conditions), the controller in the energy system may modify the protocol of charging so as to stop charging in order to ensure coverage of base electricity consumption in the household.

Preferably, the energy storage system is furthermore configured for monitoring a charging state and/or for monitoring presence of batteries, and the said controller within the energy storage system is configured for using any resulting monitoring information for controlling the charging and/or discharging. The configuration may be arranged as specific sensors and/or by means for carrying out an electrical test on the charging state and/or the presence of a battery.

The controller in the energy storage system is furthermore preferably provided with an internal clock enabling to enable a change in operation of the energy storage system (i.e. less or more charging or discharging) at a predefined moment in time, as for instance specified in a guideline.

The controller is in a further embodiment provided with a memory for storage of monitored data and/or information received from the solar panel and/or data relating to the actual charging or discharging activity of the energy storage system. In again a further embodiment, the third communication unit of the control unit may send any request for information overview to the controller, said information overview including such data as stored in the memory associated with the controller. In this manner, the exchange of information with the external third communication unit may be limited to periods when the control unit is free for (capable of) receiving such data. Furthermore, such way of information exchange facilitates transmission of data in secured manner, such as by way of any encryption. In such a case, the controller may be provided with means for encrypting information to be transmitted to the third communication unit.

In embodiments, the energy storage system further comprises at least one connection port for connecting additional energy storage units, preferably in series, thus forming a modular energy storage system with a plurality of energy storage units. This makes it possible for a user to easily extend the energy storage capabilities to her needs.

In embodiments, the energy storage system further comprises a wireless power transmission unit, arranged such that a removable, portable energy storage unit comprising a wireless power reception unit may be charged if it is positioned in a charging position. This allows a user to charge a portable, energy storage unit from the local energy source, and to take it along to another location as needed as an island battery.

In embodiments, the system comprises a plurality of energy storage systems, each plugged into a separate power socket of the home grid, and hence connected in parallel.

This has as an advantage that the two energy storage systems may be individually controlled by the control unit.

In advantageous embodiments, the control unit is also configured to be able to communicate, via the third communication unit, with a user's mobile communication device (such as a smart phone or tablet) or with another user device (such as a laptop or PC), and to provide this user device with information about the energy allocation, the local energy source and/or the energy storage system. In embodiments, the user device may also allow a user to input instructions which are sent to the third communication unit of the control unit to influence the energy allocation in the system. For instance, the user may be able to install a specific app on her device to enable communication with the control unit.

If energy consuming devices are also plugged into the home grid, this will cause a draw on the home grid. Information about this may be taken into account by the control unit as well—this information could be received from the second communication unit, but also from other sources. If the control unit receives information indicating that the local energy source produces more energy than is needed by energy consuming devices plugged into the home grid, it may allocate a certain percentage of the produced energy to the energy storage system, such that energy from the local energy source is used both for charging the energy storage system/battery and to power the energy consuming devices. This allocation may be done in terms of percentage (e.g. "allocate 20% of energy produced by the local energy source to the energy storage system" or in absolute values "allocate x Watts to the energy storage system").

In embodiments, the control unit is configured to provide a forecast for a forthcoming period of energy consumption either by way of direct monitoring or a user profile and energy production. On the basis thereof and the extent to which the means for local storage of electricity has been loaded, the processing unit of the control unit will generate control signals for the energy storage system, for instance instructing the energy storage system to load (take electricity) or unload (supply electricity), and in particular also how much to load or unload.

In embodiments, the control unit further comprises or is communicatively connected to a memory, and is configured for recording energy consumption and production as a function of time over a certain period. Both consumption and production tend to follow patterns, which will be analysed by automated algorithms (Artificial Intelligence) for each user. The control unit may further be configured to specify a pattern of energy production and a pattern of energy consumption as a function of time for a predefined period such as for instance 24 hours. Such pattern is thereafter used by the control unit in generating a forecast for energy production and energy consumption for a forthcoming period of for instance 30 minutes, 1 hours, 2 hours, 3 hours, 6 hours, 12 hours, 24 hours, or remaining time until a predefined moment in time, such as midnight.

In embodiments, the control unit is further configured to receive information on an actual state, to compare such received information on an actual state with a forecast, and to determine whether actual electricity production and/or consumption is below the forecast, equal to the forecast or above the forecast.

In embodiments, the third communication unit also receives information from other devices, and the control unit may take this into account in allocating energy. For instance, it is increasingly common for households to have a so-called "smart" meter, which registers much more precisely how much energy is drawn from the energy grid, and if relevant how much energy is output to the energy grid, and which are usually equipped with a dedicated communication unit. Such a communication unit could send information to the third communication unit, which may be taken into account by the control unit—for example, if information is received that energy is being output to the energy grid, the control unit could determine to allocate more energy to charging the energy storage system, if this is possible. Furthermore, in some embodiments, the control unit may generate control commands so as to effectively limit supply of electricity to the home grid from the public grid to a predefined level for a predefined period of time. The supply may be specified to be zero, to have a predefined maximum value, to have a fixed value or otherwise in accordance with a predefined protocol. This is embodied by means of controlling the charging and discharging of the energy storage system.

In certain embodiments, a meter measuring supply of electricity from the public grid to the home grid is provided with a communication unit. Such a meter is also known as a "smart meter". Preferably, this communication unit is coupled into the system, such that the control unit may read out the meter, or that transmitted data on the meter can be obtained by the control unit. In a further implementation the control unit is furthermore configured for comparing said data from the meter with information from the local energy storage system and optionally the local energy source. The control unit may further be configured to generate a test and/or to provide a report in the event of mismatch between data transmitted from the smart meter and information from the local energy storage system and local energy source. The test for instance involves regular monitoring of the said data and said information, for instance every hour and/or every day during a test period and storing such data. The test may further comprise read out of data and/or information when the system is in a predefined test state.

In embodiments, which can be but need not be combined with the previous embodiments, if at least one of the energy consuming devices is a so-called "smart" or "Internet of Things (IoT)" device, having a dedicated communication unit, information from this device could also be taken into account, for instance with respect to expected energy requirements. In advantageous embodiments, the control unit may even be capable of generating control signals for the "smart" energy consuming device. For instance, if a smart dish washer is plugged into the home grid, a user could indicate, via an interface of smart dish washer itself or via an app on a user device, that she would like the dishes to be done before a certain time. The control unit can then determine, based on gathered information and potentially also on predictions, what the best time would be to switch on the dish washer in the allocated time period, and allocate energy accordingly.

In embodiments, which can be but need not be combined with previously described embodiments, additional information may be gathered from external sources, such as the internet or a data provider. For instance, weather information and predictions could be retrieved and taken into account, in particular to estimate and/or predict energy production; as could pricing information relating to both the buying of energy from and the delivering of energy to the public grid.

The object of the invention may be further achieved according to a second aspect in a method of energy allocation in a home network comprising a local energy source, a local energy storage system and a home grid, to which said local energy source and the local energy storage system are connected and which is furthermore provided with access to a public grid, which local energy source and which energy storage system respectively comprises a first communication unit and a second communication unit configured for communication via a wireless local area network to a third communication unit of a control unit, which method comprising the step of controlling charging and/or discharging in the local energy storage system in dependence on electricity production by the local energy source and electricity consumption in the home network.

In one preferred implementation, the charging and/or discharging is set so as to minimize flow of electricity from the public grid into the home grid or vice versa. More preferably, such a setting of minimizing flow of electricity between the public grid and the home grid is arranged during a predetermined period, such as for instance half a day (12 hours), a full day (24 hours), a week (7 days). Herein, the discharging and/or charging of the local energy storage system is controlled not merely in view of actual production and consumption of electricity but also on a forecast of energy production and consumption in the said predetermined period.

The forecast may be obtained based on monitoring electricity consumption and production as a function of time (such as time during the day), use of public information (such as a weather forecast) and user information provided by a user, for instance by means of a user device coupled into the system. In order to carry out monitoring, it is preferred that information is transmitted from the local energy source and the local energy storage system to the control unit by means of the specified communication units. The system is further configured for storage of such information and/or for processing of such information in accordance with a protocol (i.e. as defined in a computer program), so as to derive effective production and consumption as a function of time. In order to use public information, the system is preferably provided with means for obtaining such information, wherein the protocol is configured so that such public information can be used as input thereto, so as to estimate an effective production (and consumption) forecast. Means for incorporating user information are known per se to the skilled person.

Preferably, the controlling step comprises:
transmitting an operation guideline from the control unit to the energy storage system;
receiving information on actual electricity production and electricity consumption,
modifying the operation guideline based on the received information, when needed and
setting a rate of charging or discharging in conformation with the operation guideline.

As explained hereinabove with reference to the system of the invention, the guideline is advantageous to allow cooperation of the control unit with a local controller, such that the local controller is configured to modify settings of the operation guideline based on locally generated information, without full dependence on the externally located control unit.

Any further embodiment and implementation discussed hereinabove with respect to the system is also applicable to the method of the invention. It will be further understood that the method of the invention is preferably performed on the system of the invention.

BRIEF DESCRIPTION OF THE FIGURES

The invention will be further elucidated at the hand of the figures, wherein.

DETAILED DESCRIPTION

Figure 1:
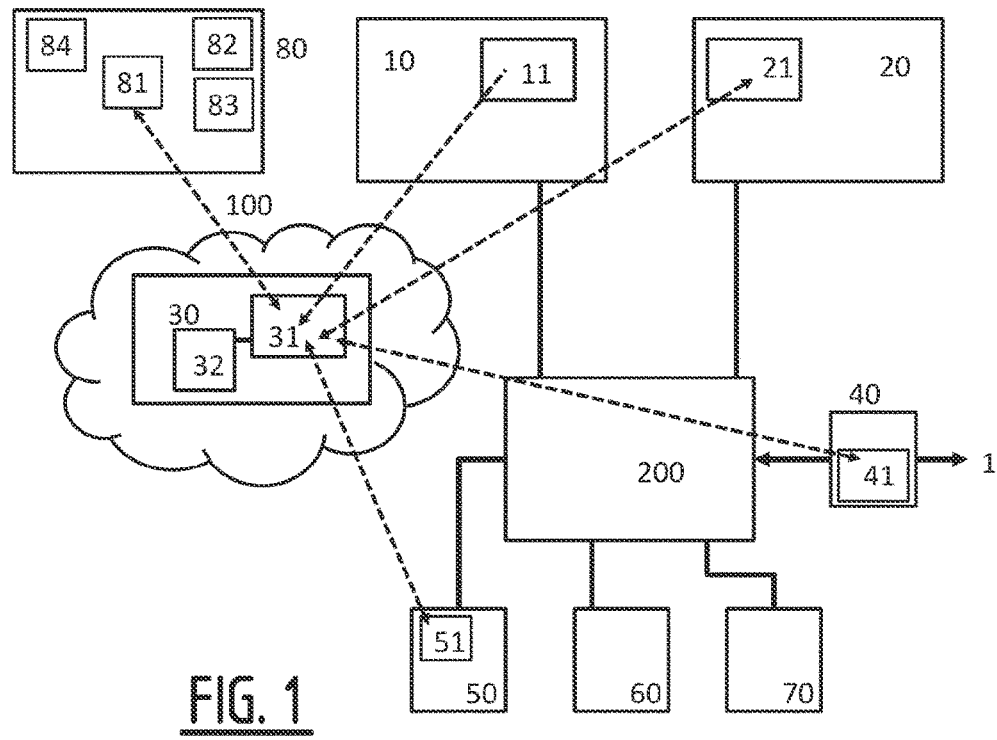
FIG. 1 shows a block diagram of an embodiment of the claimed system.

The embodiment shown in FIG. 1 is a preferred embodiment; not all shown elements need to be included in all embodiments of the claimed system. Equal reference numerals in different figures refer to equal or corresponding elements.

FIG. 1 shows a home grid 200. Plugged into this home grid are local energy source 10, for instance a solar panel system, which comprises a first communication unit 11; an energy storage system 20, which comprises a second communication unit 21; and a plurality of energy consuming devices 50, 60, and 70, wherein one of the energy consuming devices 50 is a "smart" device including a communication unit 51. Home grid 200 is connected to the public grid 1 via a smart meter 40, which also comprises a communication unit 41.

FIG. 1 also depicts a user device 80, comprising a communication unit 81, a processing unit 82, an input unit 83, and a display 84. This device could for instance be a smart phone or tablet, but is not limited thereto. With this user device, a user can access information, such as information about current, past, and/or predicted energy production; information about current, past, and/or predicted energy usage by the energy consuming devices; information about current, past and/or predicted charging state of the energy storage system; etc. The user device may also allow a user to put in preferences about energy allocation. This may take many forms: it could be that a user can simply input commands for the energy storage system and optionally smart devices directly, but other options are also possible, for instance inputting a weighting of factors to be taken into account by the control unit.

FIG. 1 further shows control unit 30, comprising a communication unit 31 and a processing unit 32. In the figure, this control unit is depicted symbolically as being part of "the cloud", 100. This is indeed true for preferred embodiments, but a local control unit 30 may also be used. Furthermore, the communication unit 81 and processing unit 82 of the user device may also constitute or be part of the control unit in some embodiments.

Additionally, note that the "control unit" may in fact consist of several communicatively coupled control units:

for instance, the energy storage system may have a processing unit and be able to perform some control itself, based on limited input. For instance, the energy storage system may comprise an inverter including a further control unit configured for controlling the energy allocation to at least one energy consuming devices plugged into the home grid and comprising a programmable clock, so as to define a time at which operation of the device is to start and/or maintenance of the devoice is to start. A control program to be executed and to be monitored may in these cases be loaded on the further control unit, for instance via commands from control unit 30. On the basis of monitoring data obtained from local energy source 10 and optionally any other monitoring data, for instance from the meter 40, the further control unit is then configured for optimizing the control program within pre-defined limits. The advantage of this architecture is that the need for transmission of data over the home network and out of the home to control unit 30 can be minimized. This minimizes the risk for failure due to malperformance of data exchange and the risk that any third non-authorized person may get access to such data on production and consumption of electricity, for instance to trace whether anybody is actually at home.

Note that while in FIG. 1, arrows depict information exchange directly from communication unit 31 of control unit 30 to each other the other communication devices, this is not intended to imply that communication always needs to be direct, and information may also be relayed between various communication units. Furthermore, as will be shown in FIG. 2, information within the home may be transferred to a control unit in "the cloud" via, for instance, a WLAN router, with the communication units 11, 21, 41, 51 and/or 81 being embodied as WiFi communication units in the local area network.

Furthermore, it may be advantageous for first communication unit 11 of local energy source 10 and second communication unit 21 of energy storage system 20 to be configured to be able to communicate with each other through direct wireless communication—using such protocols as REST APIs, using Oauth2 authentication, and MQTT. This direct communication may be the default for these communication units, but may also be used as a fallback if communication via the home WLAN-network is not functioning properly.

These examples are not intended to be limitative, and many alternative communications methods, preferably but not necessarily wireless communication methods, can be used and/or combined.

Figure 2:
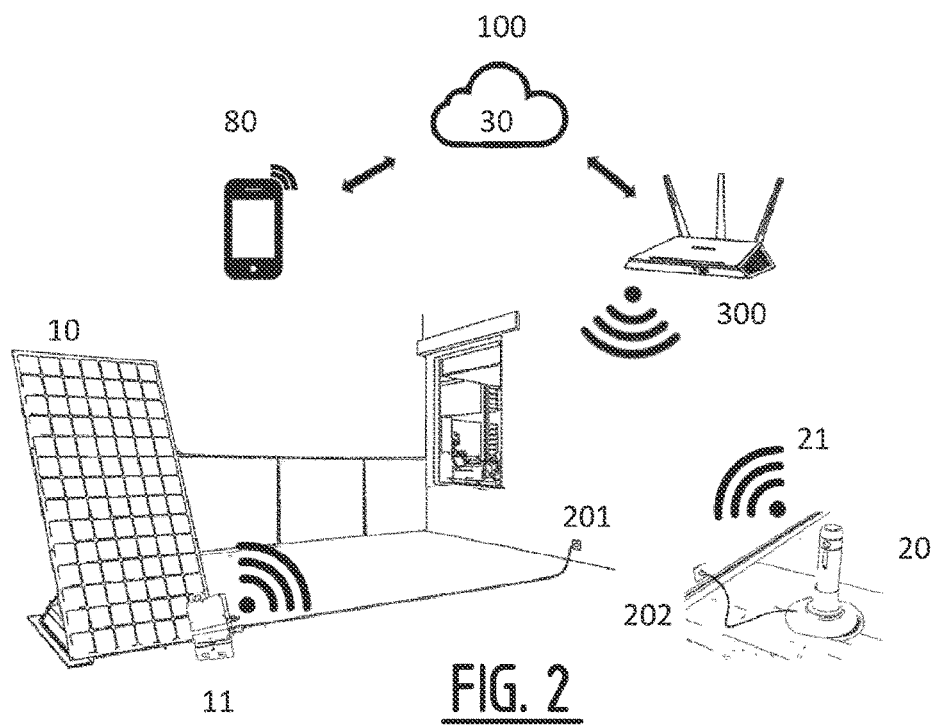
FIG. 2 shows some of the elements included in an embodiment of the system in an abstracted manner.

FIG. 2 shows some of the elements of the system in a more figurative manner. Local energy source 10 consists of solar panels plus an inverter connected to a wireless communication unit 11, wherein the local energy source is plugged into a first power socket/outlet 201 of home grid 200; the energy storage system 10 is shown as a base plugged into a second power socket/outlet 202 of home grid 200 with a battery plus inverter and a wireless communication unit 21. Both first wireless communication unit 11 and second wireless communication unit 21 exchange information wirelessly with WiFi router 300, which router is in communication with cloud 100, which performs the function of control unit 30. User device 80 is also capable of communicating with cloud 100, can receive information about the home grid therefrom, and may also send information to cloud 100 to control energy allocation in the home grid.

Embodiments of the system, for instance as depicted in FIG. 1 and/or FIG. 2, may allow one or more of the following use-cases to be implemented:

a. Stand-alone|In this case, a user plugs a local energy source, such as a solar panel, and an energy storage system, into home grid power sockets/outlets. The two are coupled to a wireless data or information network, for instance a WLAN network, for provision of information to a control unit, and via the communication unit of the control unit, to a user device, such as a mobile phone. No other devices need to be connected, no power usage data is collected. Hence, usage profiles cannot be created. Energy production data is provided to the user device and displayed to the user on the display. The user may then choose whether to charge only when the local energy source, for instance a solar panel, is producing electricity, or to manually program the energy storage system to charge and discharge according to the time of day. In both cases of charge/discharge, either in connection with local energy production as chosen by time, the user can regulate the power. E.g., the user may input instructions to charge the energy storage system when the local energy source is producing with 50% of capacity. This means that the energy storage system will only charge 50% of the reported power output, leaving the remaining 50% to discharge directly from the local energy source into the home grid for use in energy consuming devices plugged into the home grid. Additionally or alternatively, the user may input, via the input unit of the user device, instructions relating to when to discharge the stored power and, again, at what power level. E.g., the user may input instructions to discharge the energy storage system from 18:00 until 24:00 at 50 W. Re-charging of the energy storage system will re-initiate when the local energy source starts producing energy again. Additionally or alternatively, for instance if the user has a variable electricity contract, she may choose to charge the energy storage system during a specific time period, day or night, whenever the electricity from the grid might be cheapest. Discharge then functions identically. Any energy produced by the local energy source is then used by the home grid, as energy consuming devices demand it.

b. Usage-Driven|This use-case is in particular relevant if a so-called "smart" meter is present in the system, wherein data from this meter, such as energy supply data, can be made available to the control unit. This data may for instance be released by the power companies at the user's behest to create a more detailed user profile. Usage data is gathered live or once a day and a comprehensive profile developed over time. Certain peaks of maximum usage are then likely to become evident. The production and storage capacities may then be used as input for an algorithm to minimize those usage peaks, depending on the available storage capacity of the energy storage system. In certain cases, other "smart"/IoT devices, such as smart thermostats, may also be configured to supply information to the control unit, for instance to i. Optimize a consumption curve even further to increase use of renewable, locally produced electricity;

ii. Regulate heating/cooling, appliances, etc. to minimize costs.

c. Micro-Grid|Several embodiments of the claimed system can be connected to either small direct grids (e.g. several apartments in one building) or virtual micro grids in a geographic area. The control unit may then control several systems in a micro grid to further optimize their renewable electricity consumption and minimize costs by using both production and storage capacity within the network. E.g. the excess power produced by one user can be consumed or stored by other users when they require electricity.

d. Price-Driven|In certain embodiments wherein there is a possibility of cooperation with power companies and power brokers, it is possible to provide information about power contracts to the control unit, based on geographical residence, from which the user may choose the most suitable one. An algorithm will then develop a charge/discharge cycle to optimize cost, based on the stored pricing information of variable price contracts. Note that this does not necessitate the presence of a local energy source in the home grid, but can be used separately.

Figure 3:
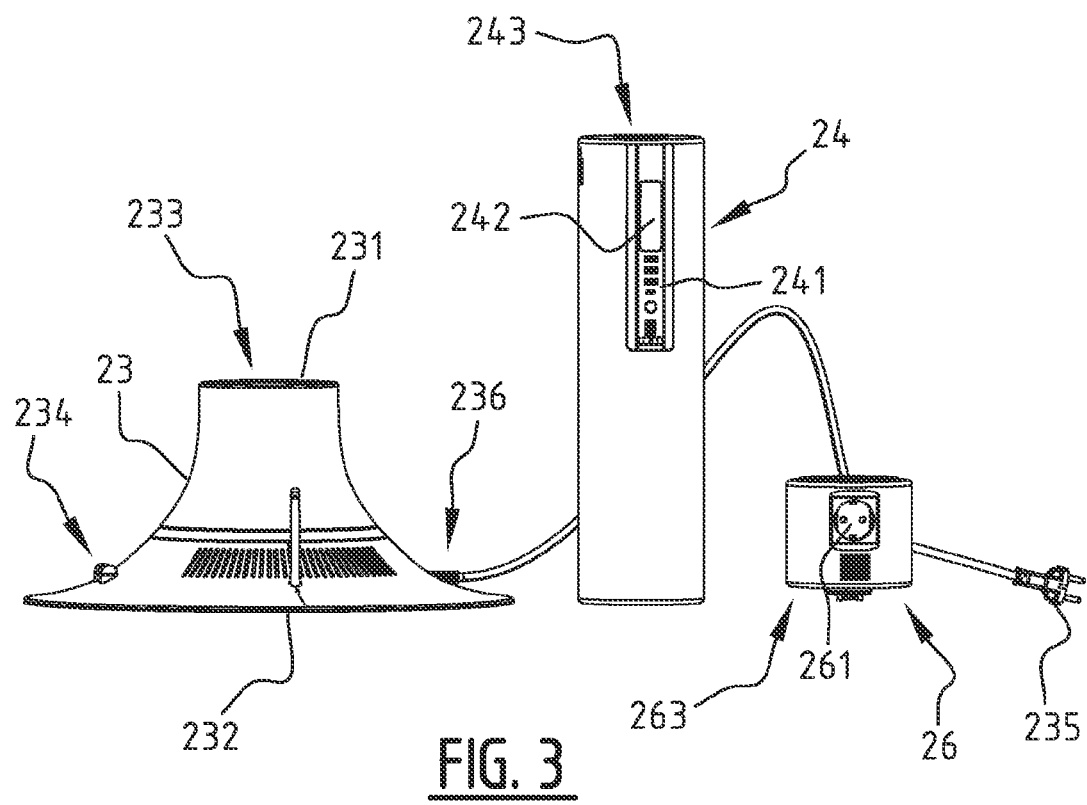
FIG. 3 shows a front view of individual elements of a first embodiment of an energy storage system for use in the invention.
Figure 4:
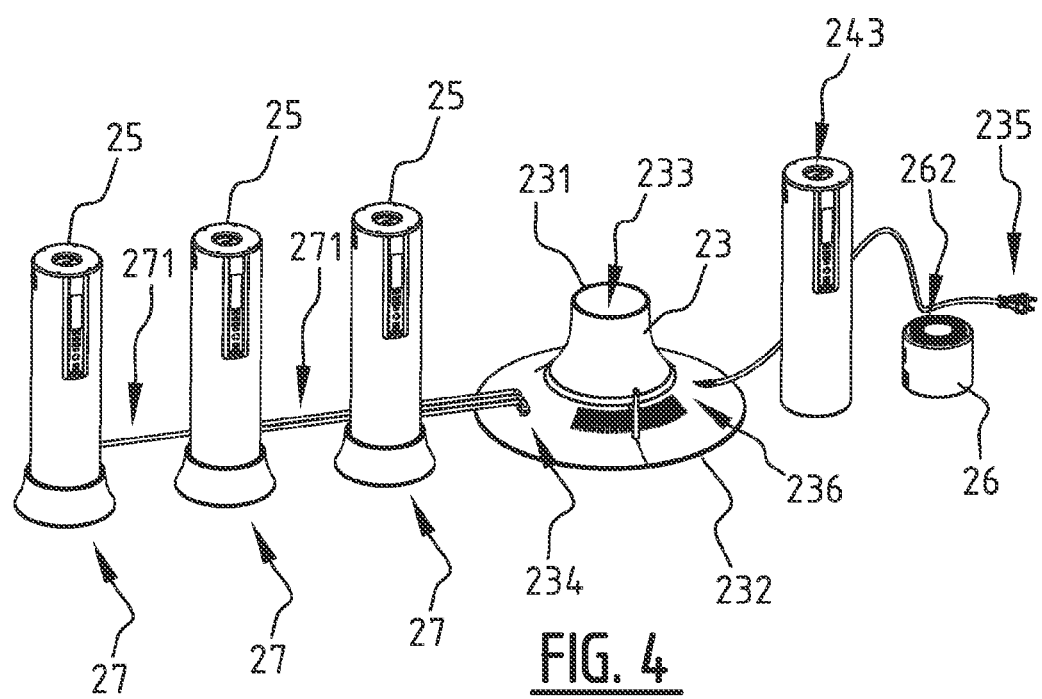
FIG. 4 shows the energy storage system of FIG. 3 in bird's eye perspective, including more batteries and cable connections between several elements.
Figure 5:
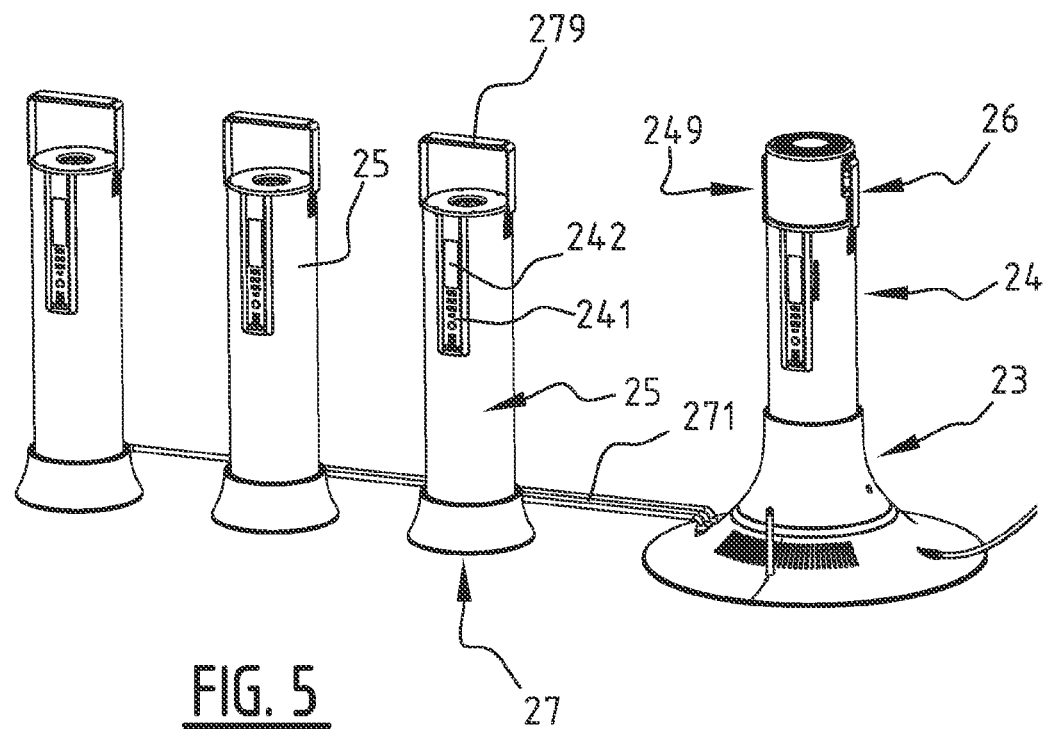
FIG. 5 shows the energy storage system of FIG. 3 in assembled form.

FIG. 3-5 show an energy storage system 20 according to a first embodiment. The energy storage system 20 of this embodiment is composed of several elements 23, 24, 25, 26, which are mutually electrically connected and—partly mechanically connected into an assembly. FIGS. 3 and 4 show the individual elements of the system 20, FIG. 5 shows the system 20 in an assembled state. As shown in FIG. 5, herein the system comprises an assembly of a base 23, a first battery 24 and a power outlet 26. Coupled thereto are any optional extra batteries 25. Each such extra battery is present in a battery holder 27, which is connected by means of a cable 271 to a cable connector 234 of the base 23, and may be provided with a gripper 279.

The base 23 is provided in this first embodiment with the second communication unit 21. Shown in this figure is an antenna. It will be understood by a skilled person that further electrical components of the second communication unit 21 (such as a transceiver) are hidden within the base 23. The base 23 furthermore comprises a controller 22—not shown in FIG. 3-5. The controller is suitably a microcontroller chip; note that the second communication unit 21 may then also be provided on or using this microcontroller chip. It may be provided with a memory. The base is further provided with a bottom side 231 and a top side 232. At the top side 232, a socket 233 is present to which a battery 24 can be connected. This socket 233 provides both a mechanical connection and an electrical connection so as to charge and/or discharge the battery 24. The base is also provided with a cable connection to the power grid 235 via connector 236.

The battery 24 is typically a conventional lithium-ion battery as known in the art. The battery 24 is provided with an on/off button 241 for use as an island battery, to conserve power, a display 242 and a connector 243 on its topside, onto which a further unit 26 can be provided. The further unit 26 is in this embodiment a power outlet unit, which comprises a socket 261 and a wireless charging plate 262. The further unit 26 is also provided with a connector 263, which matches the connector 243 of the battery 24. The battery 24 is furthermore provided with a grip 249.

Figure 6:
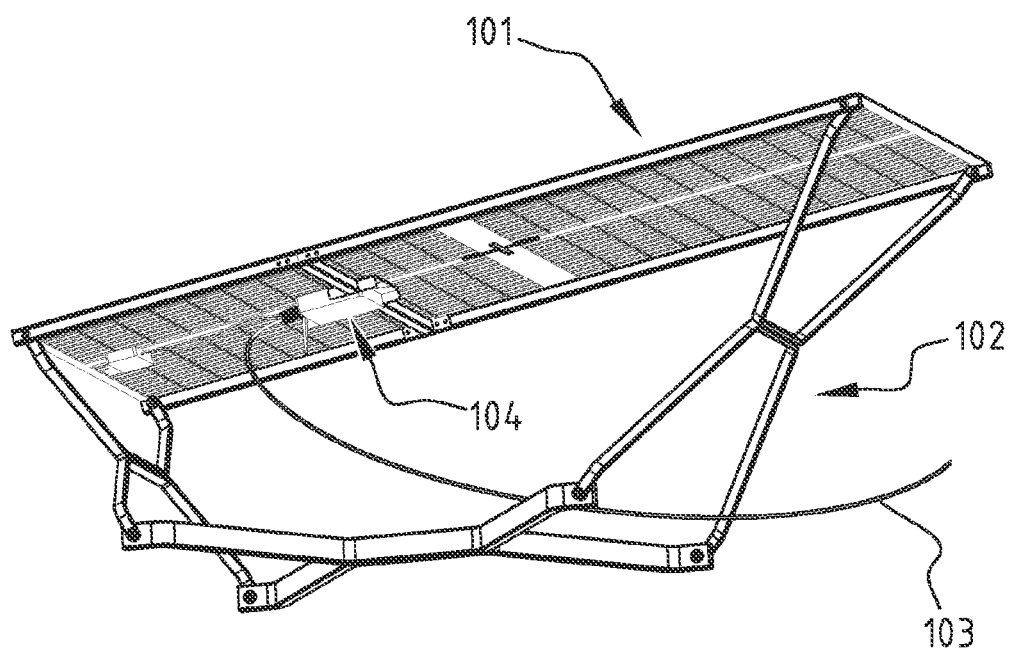
FIG. 6 shows an embodiment of a local energy source which may be included in the system, specifically a solar panel.
Figure 7:
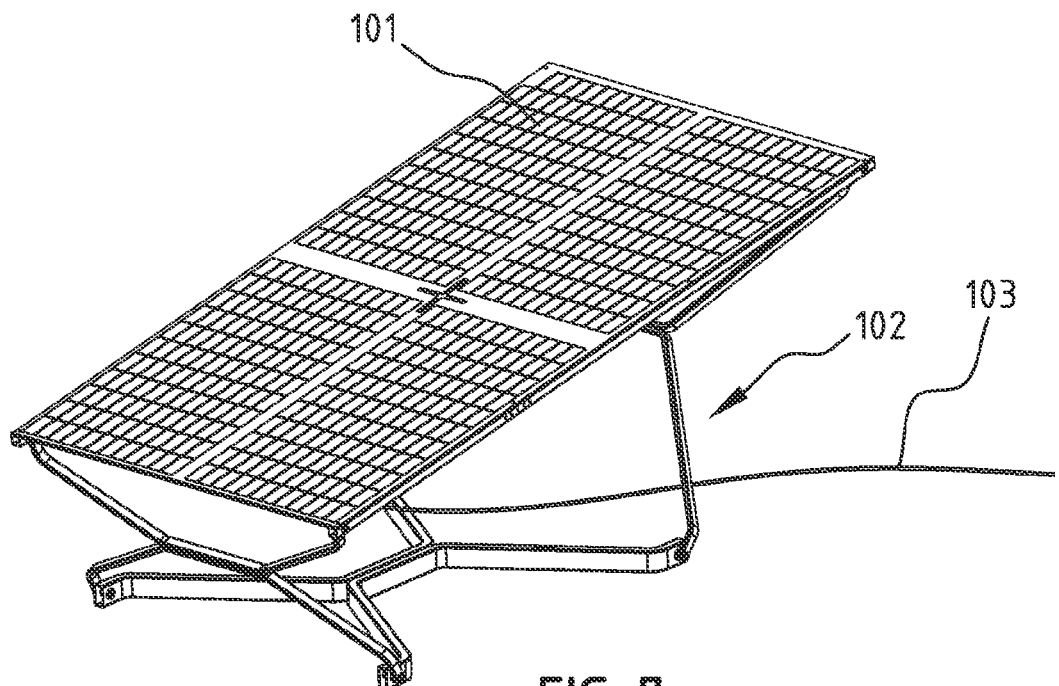
FIG. 7 shows the embodiment of FIG. 6 according to a different perspective.

FIGS. 6 and 7 show an embodiment of a solar panel as a local energy source, from two different perspectives, comprising a photovoltaic array 101, a support structure 102, a cable connection to the power grid 103, and an inverter 104. Note that this particular embodiment is not only plug-and-play, i.e. pluggable into a generic power socket using cable connection 102, but intended to be portable: it may be positioned as needed using support structure 102, which may in embodiments be configured to allow for a plurality of orientations of the photovoltaic array. Typically, first communication unit 11 (not shown in these figures) will be incorporated into inverter 104, but it may also be embodied as a separate unit.

Figure 8:
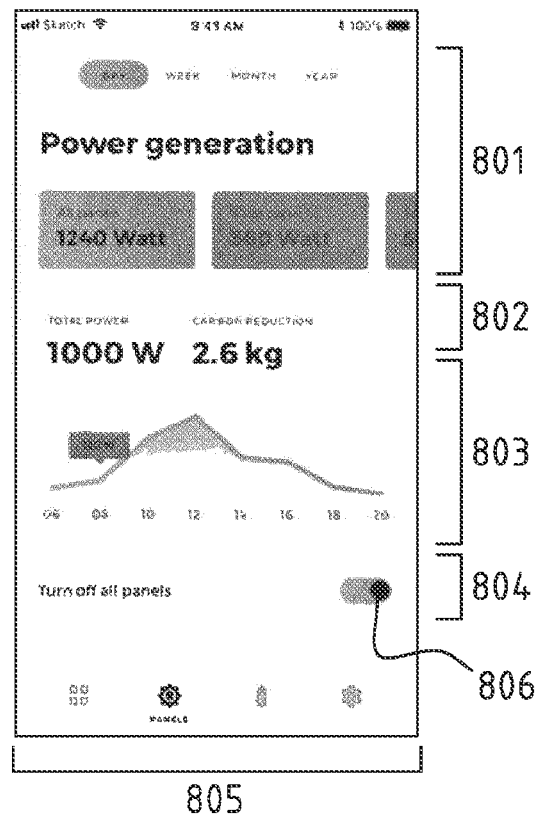
FIG. 8 shows a possible screen for monitoring and control of one or more solar panels included in an embodiment of the system.

FIG. 8 illustrates an example screen for an application ("app") for a portable device used in the context of the present system. In this example, a first section 801 shows the power generation in the last day, with buttons also allowing a user to see instead the power generation for the past week, month or year. A second section 802 shows the total power produced, and the associated carbon reduction achieved. A third section 803 shows a graph of the production over time. A fourth section 804 comprises a slide button 806 which allows a user to turn off all the panels if so desired. A fifth or menu section 805 allows a user to access different section, such as a dashboard, a battery monitoring and control screen, and settings—the "panel" icon is emphasized to make clear which screen is presently being shown.

Figure 9A:
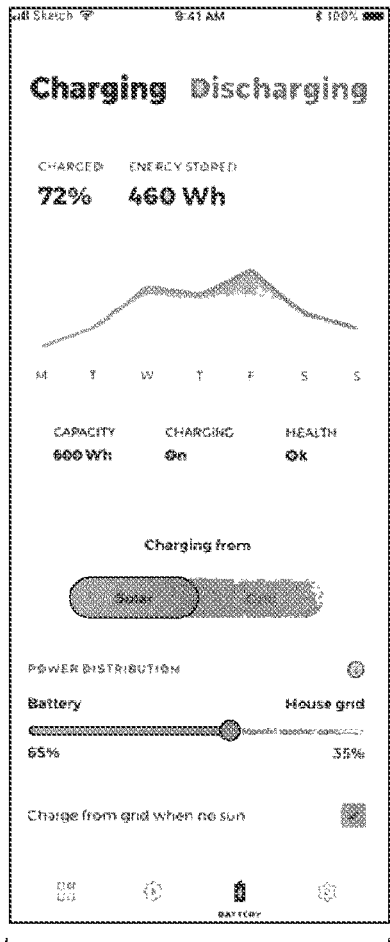
FIGS. 9A-9C show possible screens for monitoring and control of an energy storage system included in an embodiment of the system, according to different situations.
Figure 9B:
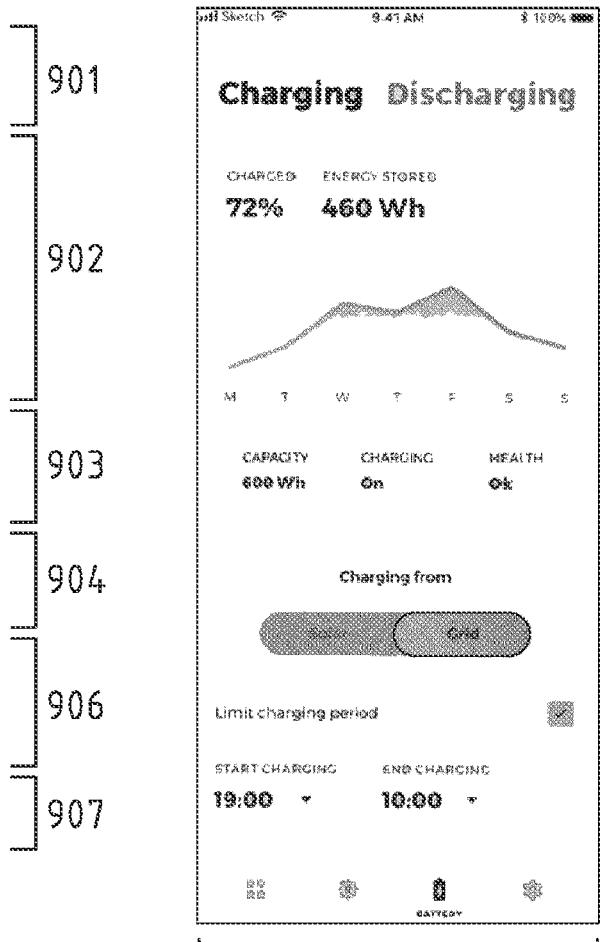
Figure 9C:
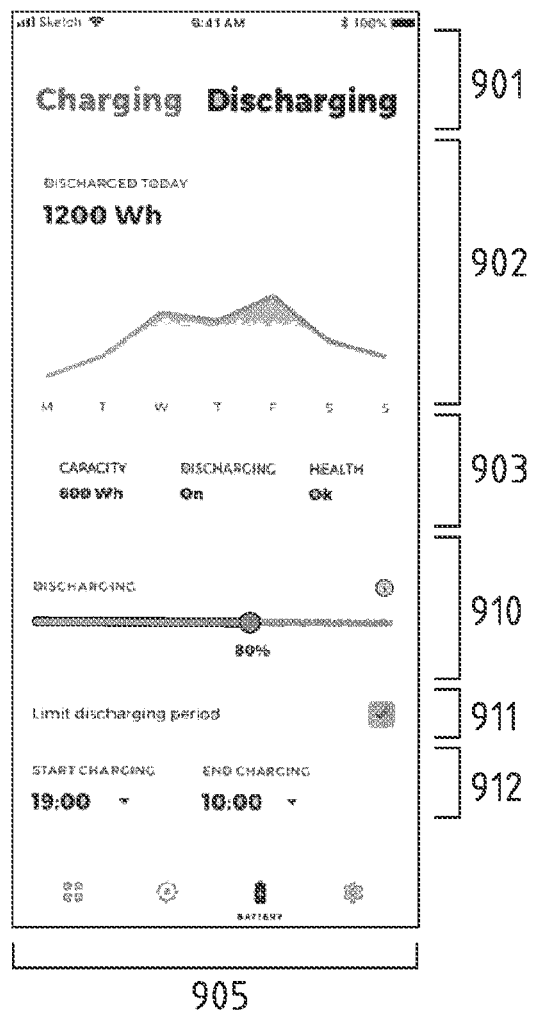

FIGS. 9A-9C show example screens for the application, which may be shown when selecting the "battery" option in menu section 805—fifth or menu section 905 is then modified to emphasize the battery icon instead of the "panels" icon. Specifically, FIG. 9A shows an example screen that may be displayed when the energy storage system is charging and a local energy source, specifically one or more solar panels, is present in the system. FIG. 9B shows an example screen that may be displayed when the energy storage system is charging and there is no local energy source currently present in the system. FIG. 9C shows an example screen that may be displayed when the energy storage system is discharging. Note that where the proportions of a screen are such that the screen cannot be fully displayed on the screen of a portable device, it may be embodiment in a scrollable manner.

FIGS. 9A and 9B show possible screens when the energy storage system is charging, i.e. taking energy from the home grid. This is indicated in a first section 901 of the screen, in which the word "Charging" is emphasized and the word "Discharging" is de-emphasized. Second section 902 of the screen shows the percentage of the energy storage system which is charged, and furthermore specifies how much power (in Wh) the energy storage system is able to provide as a result. Second section 902 also shows the evolution of the charge of the energy storage system over time, for instance throughout the week. In a third section 903, some information is given about the energy storage system, namely in this example the storage capacity, whether charging is on, and an indication of the health of the local energy storage system.

The energy that the energy storage system is taking from the home grid may be energy generated by a local energy source such as one or more solar panels or energy from the public grid—note that the energy storage system by itself cannot distinguish between the two. Therefore, in the fourth section 904, it may be indicated—either by a user, or by the control unit based on whether or not it receives information indicating that a local energy source is plugged into the system, and optionally the content of information received from a local energy source, if present—whether the energy storage system is charging from "solar" (or another local energy source) or "grid".

The remainder of the screen may be adapted based on the chosen or determined source of charge. FIG. 9A shows an example screen which may be displayed in a situation in which the battery is charging from one or more solar panels (or another local energy source). In such a case, sixth section 906 shows a slide bar indicating how much of the generated power is distributed to the energy storage system/battery, and how much is left in the house grid for other energy consuming devices. Note that the shown bar indicated percentages, but allocation of a specific amount of power is also possible. A user may use this slide bar to assign a certain percentage of generated power to the battery, or the control unit may set the percentage to an advantageous value based on information received from various sources. Seventh section 907 shows a tick box, which the user can tick to indicate that that the energy storage system should charge from the grid when there is no sun (i.e. when information received from the local energy source indicates that there is little to no power production), or untick to indicate that the energy storage system should refrain from charging when there is no sun.

Note that while most examples given in this specification assume that there is a local energy source plugged into the system, the energy storage system may be advantageously used even in the absence of such a source. FIG. 9B shows a possible screen that can be displayed in such a situation. Instead of sixth section 906 and seventh section 907, eighth section 908 and ninth section 909 are displayed: eighth section 908 comprises a tick box which the user can tick to indicate that charging should be limited to a certain period, and ninth section 909 shows drop down menus which a user can use to indicate a starting time for charging and an end time for charging. Note that ninth section 909 could be left empty if the tick box in section 908 is unticked. Finally, note that the start time and end time could also be determined by the control unit based on information received from various sources in certain embodiments.

FIG. 9C shows an example screen for when the battery is discharging. This is indicated in first section 901 by emphasizing the word "discharging" and de-emphasizing the word "charging". Furthermore, the information in second section 902 may be modified to show, instead of the charged percentage and energy stored, the amount of power discharged in the current day (or in another period of time). Third section 903 may be modified to indicate that discharging is on, instead of charging, but otherwise may remain the same. The screen may further include a tenth section 310 indicating a discharging percentage. An eleventh section 911 may include a tick box which a user can tick to indicate that discharging should be limited to a certain period, with twelfth section 912 then shows drop down menus which a user can use to indicate a starting time for (dis)charging and an end time for (dis)charging. Note that twelfth section 912 could be left empty if the tick box in eleventh section 911 is unticked. Finally, note that the start time and end time could also be determined by the control unit based on information received from various sources in certain embodiments.

It should be clear that the shown screens are intended merely to show the possibilities and not to limit the interface to the specific arrangement shown. Many other configurations are possible to allow a user to monitor the local energy source(s) and energy storage system(s) plugged into the home grid and exchanging information with the control unit; and preferably also to allow a user to control the local energy source(s) and energy storage system(s) plugged into the home grid directly or by providing the control unit with certain preferences and/or constraints.

REFERENCE NUMERALS

1 public grid
10 local energy source
11 first communication unit
101 photovoltaic array
102 solar panel support structure
103 solar panel cable connection to power grid
104 inverter
20 energy storage system
21 second communication unit
22 controller (of the energy storage system)
23 base
231 top side of base
232 bottom side of base
233 socket for battery connection
234 cable connector to extra batteries 25
235 cable connection to power grid
236 connector
24 first battery
241 on/off button
242 display
243 connector for power outlet unit
249 gripper
25 extra battery
26 power outlet unit
261 socket
262 wireless charging plate
263 connector to battery
27 holder for extra battery
271 cable to holder 27
279 gripper
30 control unit
31 third communication unit
32 processing unit
40 smart meter, i.e. electricity meter that can be read out electrically (via wireless and/or wired communication)
41 communication unit
50, 60, 70 energy consuming devices
51 communication unit of device 50
80 user device
81 communication unit
82 processing unit
83 input unit
84 display
800 example screen
801 first section
802 second section
803 third section
804 fourth section
805 fifth or menu section
806 slide button
901 first section
902 second section
903 third section
904 fourth section
905 fifth or menu section
906 sixth section
907 seventh section
908 eighth section
909 ninth section
910 tenth section
911 eleventh section
912 twelfth section
100 cloud
200 home grid
201 first power socket/outlet
202 second power socket/outlet
300 WiFi router

The invention claimed is:

1. An energy allocation system, comprising:
a control unit;
a battery controller to route electrical power to or from an energy storage system, wherein the battery controller is controlled by the control unit; and
one or more inverters that produce AC electrical power, wherein the one or more inverters is controlled by the control unit, and wherein the control unit includes a wireless module configured to communicate instructions limiting production of the AC electrical power by at least one of the one or more inverters to selectively limit the AC electrical power reaching through an electrical utility meter to an electrical utility grid.

2. The energy allocation system of claim 1, further comprising:
an electronic device coupled with the control unit to supply a user with information regarding energy production, consumption, and configurations.

3. The energy allocation system of claim 1, wherein the production of AC electrical power is limited based on a measurement of electricity passing between a home grid and a public grid.

4. The energy allocation system of claim 3, further comprising:
a plurality of energy storage systems, wherein each of the plurality of energy storage systems can be selectively controlled to provide electrical power.

5. The energy allocation system of claim 1, further comprising:
one or more solar panels, wherein at least one of the one or more inverters has an input that can be connected to the one or more solar panels, and outputs that can provide AC electrical power.

6. The energy allocation system of claim 1, wherein the control unit includes a processing unit.

7. The energy allocation system of claim 1, wherein at least one of the one or more inverters produces AC electrical power from DC electrical power stored by the energy storage system.

8. The energy allocation system of claim 1, wherein the production of the AC electrical power by the at least one of the one or more inverters is not more than an amount of AC electrical power needed by energy-consuming devices powered by the home energy grid.

9. An energy allocation system comprising:
one or more solar panels that produces DC electrical power for a home energy grid, wherein at least a portion of the DC electrical power is stored in an energy storage system;
one or more inverters that produces AC electric power from the DC electrical power produced by the one or more solar panels, wherein the AC electrical power is provided to energy-consuming devices powered by the home energy grid; and
a control unit that manages distribution of electrical power throughout the home energy grid, wherein the control unit prevents a flow of electricity from the home energy grid to a public energy grid connected to the home energy grid based on one or more of (1) the portion of the DC electrical power stored in the energy storage system, and (2) consumption of the AC electric power by the energy-consuming devices powered by the home grid.

10. The energy allocation system of claim 9, further comprising the energy storage system.

11. The energy allocation system of claim 10, wherein the energy storage system further comprises a plurality of batteries, wherein each of the plurality of batteries can be selectively controlled to provide electrical power.

12. The energy allocation system of claim 9, further comprising:
a battery controller to route electrical power to or from the energy storage system, wherein the battery controller is controlled by the control unit.

13. The energy allocation system of claim 9, further comprising:
an electronic device coupled with the control unit to supply a user with information regarding energy production, consumption, and configurations.

14. The energy allocation system of claim 9, wherein at least one of the one or more inverters produces AC electrical power from DC electrical power stored by the energy storage system.

15. The energy allocation system of claim 9, wherein the production of the AC electrical power by the at least one of the one or more inverters is not more than an amount of AC electrical power needed by the energy-consuming devices powered by the home energy grid.

16. A method for allocating energy by an energy allocation system connected to a home energy grid, the method comprising:
determining an amount of energy produced by one or more solar panels, wherein the amount of produced energy is provided to the home energy grid for consumption by one or more energy-consuming devices powered by the home energy grid;
determining an amount of energy consumed by the one or more energy-consuming devices powered by the home energy grid; and
controlling an allocation of energy in the energy allocation system based on the amount of energy produced and the amount of energy consumed to prevent a flow of electricity from the home energy grid to a public energy grid connected to the home energy grid.

17. The method of claim 16, wherein controlling the allocation of energy in the energy allocation system comprises controlling charging or discharging of the energy produced by the one or more solar panels.

18. The method of claim 17, wherein controlling the charging or discharging of the energy produced by the one or more solar panels further comprises controlling the charging or discharging of one or more energy storage systems.

19. The method of claim 16, further comprising:
supplying a user with information regarding energy production, consumption, and configurations.

20. The method of claim 16, further comprising:
receiving preferences from a user for controlling the allocation of energy in the energy allocation system.

* * * * *